United States Patent [19]
Aritake et al.

[11] Patent Number: 6,112,468
[45] Date of Patent: *Sep. 5, 2000

[54] DOOR WEATHERSTRIPPING FOR MOTOR VEHICLE AND METHOD OF MANUFACTURING THE SAME

[75] Inventors: Masanori Aritake, Ichinomiya; Masahiro Nozaki, Tsushima, both of Japan

[73] Assignee: Toyoda Gosei Co., Ltd., Nishikasugai-gun, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/035,019

[22] Filed: Mar. 5, 1998

[30] Foreign Application Priority Data

Mar. 6, 1997 [JP] Japan ..................................... 9-069302

[51] Int. Cl.[7] ........................................ E06B 7/16
[52] U.S. Cl. ............................................................. 49/475.1
[58] Field of Search ............................... 49/475.1, 479.1, 49/498.1, 492.1

[56] References Cited

U.S. PATENT DOCUMENTS 4,937,980  7/1990  Akachi et al. .
5,214,879  6/1993  Nozaki ................................... 49/475.1

*Primary Examiner*—Jerry Redman
*Attorney, Agent, or Firm*—Pillsbury Madison & Sutro LLP

[57] ABSTRACT

Door weatherstripping to be attached along a periphery of a door panel of a sash-less door has an extruded main portion of rubber and end portions joined to ends of the extruded main portion to cover front and rear upper corners of the door panel. Each of the end portions has an insert member of polypropylene and a cover member of thermoplastic olefin elastomer which is molded to cover the outer surface of the insert member.

2 Claims, 4 Drawing Sheets

DOOR WEATHERSTRIPPING FOR MOTOR VEHICLE AND METHOD OF MANUFACTURING THE SAME

CROSS-REFERENCE TO RELATED APPLICATION

This application is related to and claims priority from Japanese Patent Application No. Hei 9-69302, incorporated herein by reference.

BACKGROUND OF THE INVENTION

1. Field of the Invention

The present invention relates to weatherstripping for a motor vehicle, and more particularly to door weatherstripping to be attached along a periphery of a door panel of a sash-less door of a hardtop motor vehicle.

2. Description of Related Art

As illustrated in FIG. 1, in the hardtop-type motor vehicle, door weatherstripping W is attached along a periphery of a door panel 10 of a sash-less door 12 for effecting a seal between the door panel 10 and a door opening edge 14 of a vehicle body. Roof-side weatherstripping 16 is attached along an upper half of the door opening edge 14 for effecting a seal between a door window pane 18 and the door opening edge 14.

Upon the closing of the sash-less door 12, front and rear upper ends of the door weatherstripping W are pressed into contact with front and rear lower ends of the roof-side weatherstripping 16 to effect a seal therebetween.

One conventional example of such door weatherstripping is illustrated in FIGS. 2 and 3. As shown therein, conventional door weatherstripping W1 has a main portion 20 attached along a periphery of a door inner panel 22 and a front end portion 24 joined to a front end of the main portion 20. The front end portion 24 is secured to a front upper corner of the door inner panel 22. The door weatherstripping W1 also has at its rear end a rear end portion having an approximately identical configuration to that of the front upper end portion 24, which is to be secured to a rear upper corner of the door inner panel 22.

The main portion 20 of the conventional door weatherstripping W1 is an extruded body of rubber such as ethylene propylene rubber (EPDM). The front end portion 24 is formed by molding at the front end of the main portion 20. FIG. 3 illustrates a cross-section of the front end portion 24. As shown, the end portion 24 has a cross-section conforming with the front upper corner of the door inner panel 22, and includes an insert member 26 composed of a metallic plate which is embedded in a rubber member 28 composed of rubber of the same kind as the main portion 20.

The end portion 24 thus arranged is molded by placing the front end of the main portion 20 and the insert member 26 in a cavity of a mold, and injecting a rubber material thereinto. The end portion 24 thus molded is secured to the door inner panel 22 by fitting a clip into a clip hole 30 provided through the rubber member 28 and insert member 26.

In this conventional door weatherstripping W1, the weight proportion of the metallic insert member 26 is large. So, it has been desired to reduce the weight of the metallic insert member 26. By using synthetic resin, the weight of the insert member can be reduced, and manufacturing costs can be also reduced. The synthetic resin insert member, however, has the problem that the synthetic resin may be melted at the vulcanization temperature of rubber during molding and vulcanizing of the end portion of the door weatherstripping.

SUMMARY OF THE INVENTION

In view of the above problems of the related art, it is an object of the present invention to provide door weatherstripping having a main portion and an end portion, including a lightweight synthetic resin insert member, which is joined to an end of the main portion by molding without melting the synthetic resin insert member at a reduced manufacturing cost.

The door weatherstripping in accordance with the present invention includes a main portion to be attached along a periphery of a door panel of a sash-less door, and end portions joined to ends of the main portion, respectively, to cover front and rear upper corners of the door panel. The main portion is composed of an extruded body of rubber, and each of the end portions includes an insert member of synthetic resin such as polypropylene, polyethylene or the like, and a cover member of thermoplastic olefin elastomer, which is molded to cover the insert member, thereby to be joined to the insert member.

Thermoplastic olefin elastomer can be molded by injection molding in a mold of which the temperature is adjusted to be not more than 100° C., and no vulcanizing operation is needed. Therefore, upon the molding of thermoplastic olefin elastomer after placing the synthetic resin insert member in a cavity of the mold, the synthetic resin insert member does not melt and does not deform.

Thermoplastic olefin elastomer has flexibility and resiliency, and consequently exhibits excellent sealing performance. Thermoplastic olefin elastomer also has compatibility with EPDM rubber which is used normally as a main portion of the weatherstripping, so, the joining strength of the end portions to the main portion can be ensured.

The most preferred material for the insert member of the end portion is polypropylene. Polypropylene has a high hardness and good compatibility with thermoplastic olefin elastomer. The temperature of thermoplastic olefin elastomer injected upon molding the end portion is as high as about 200° C., but the thermoplastic olefin elastomer is cooled within the mold in a short time. This results in only the surface area of the insert member melting and being joined to the cover member of thermoplastic olefin elastomer. Therefore, it is unnecessary to embed the insert member in the cover member. With a double-layered structure where the cover member is simply laid on the outer surface of the insert member, an integral end portion can be provided. In this case, an inner surface of the insert member is exposed, but no rust is produced therein because the insert member is made of synthetic resin.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
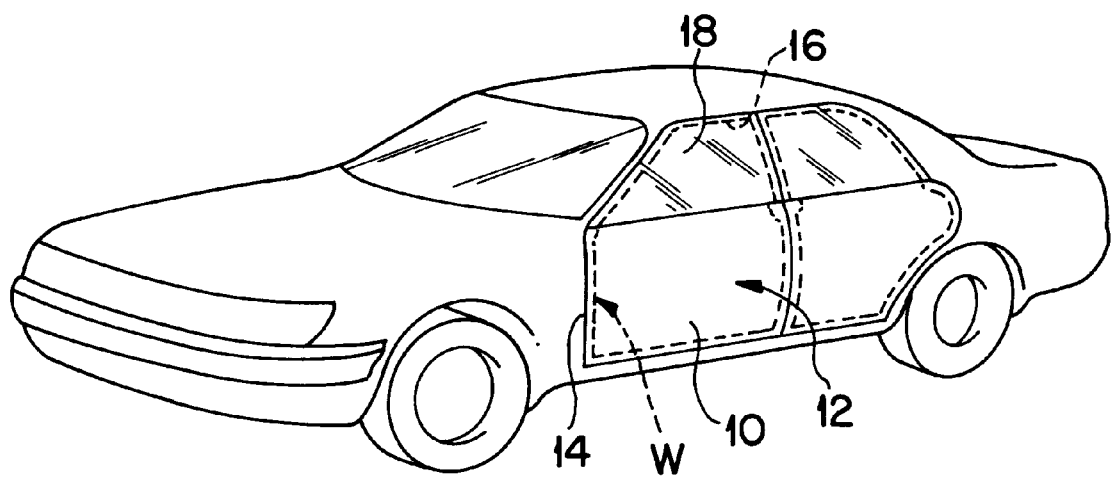
FIG. 1 is a perspective view of a motor vehicle to which conventional or present door weatherstripping is applied.
Figure 2:
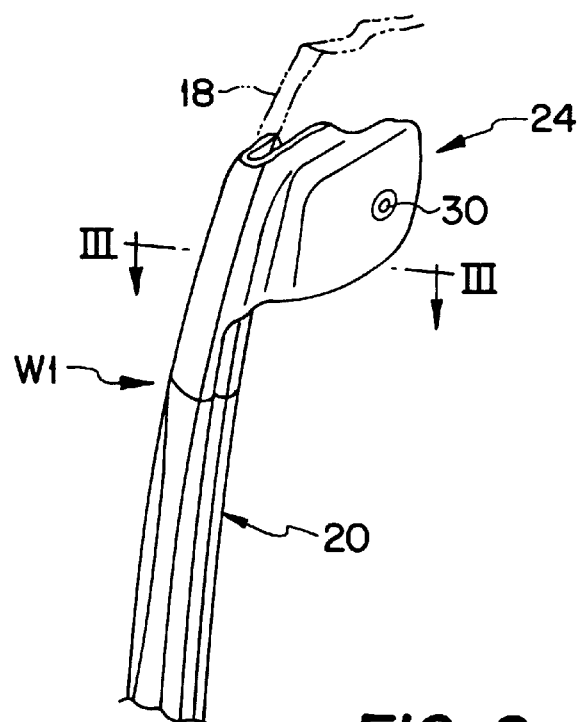
FIG. 2 is a partial perspective view of the conventional door weatherstripping.
Figure 3:
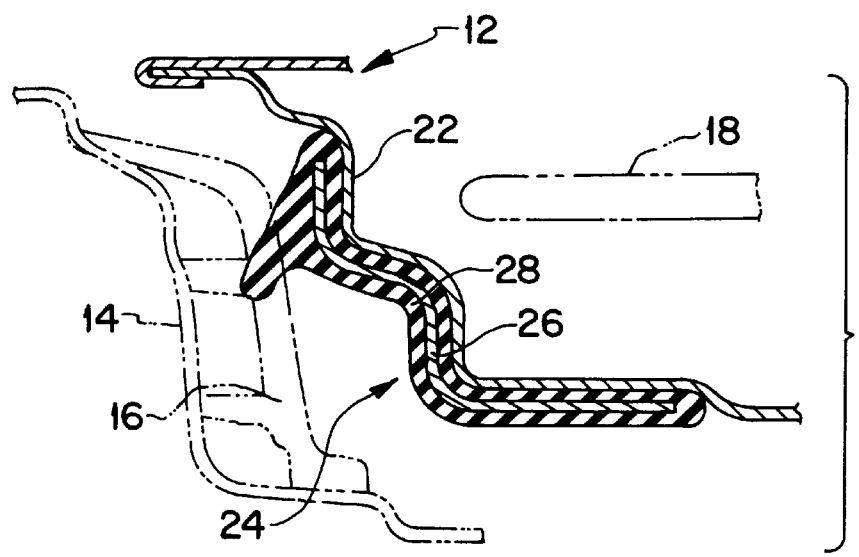
FIG. 3 is a cross-sectional view taken along line III—III of FIG. 2.
Figure 4:
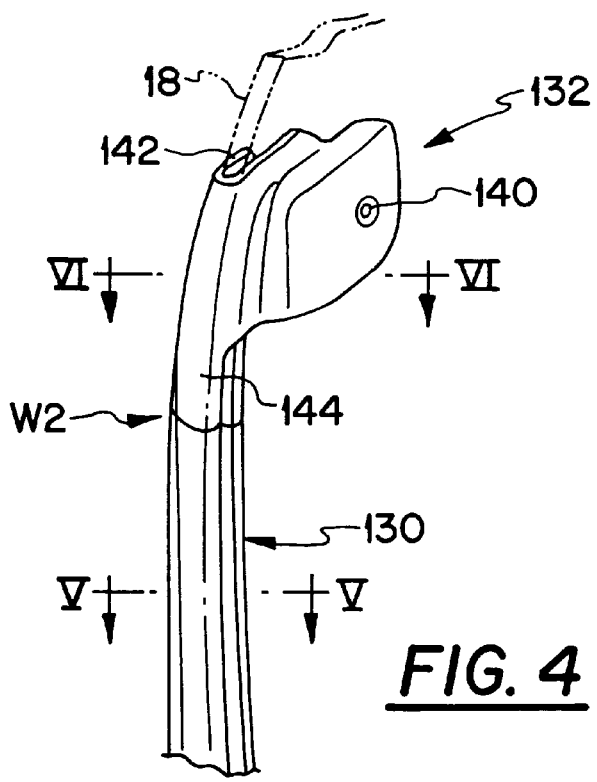
FIG. 4 is a partial perspective view of a first preferred embodiment of door weatherstripping in accordance with the present invention.
Figure 5:
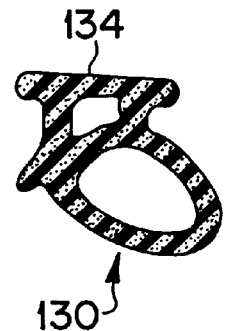
FIG. 5 is a cross-sectional view taken along line V—V of FIG. 4.
Figure 6:
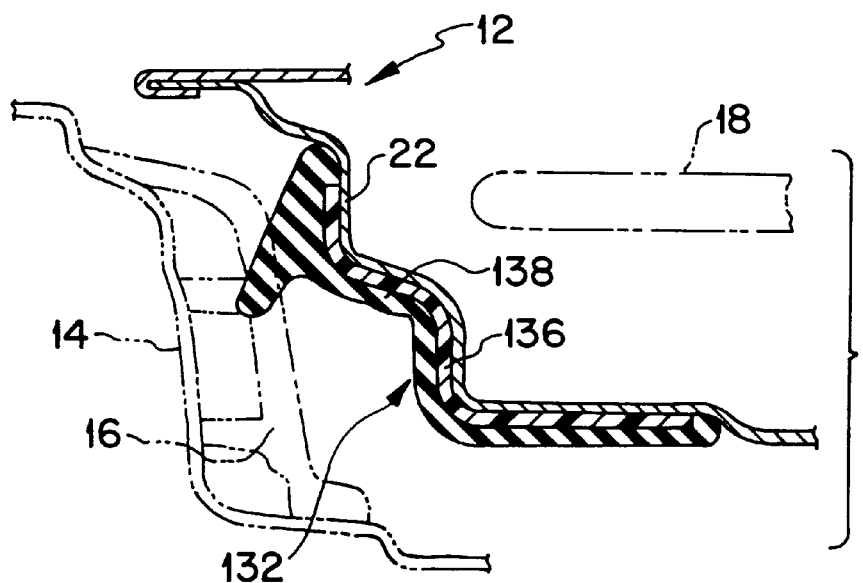
FIG. 6 is a cross-sectional view taken along line VI—VI of FIG. 4.

FIGS. 4, 5 and 6 illustrate a first preferred embodiment of the present invention. As shown, door weatherstripping W2 includes a main portion 130 to be attached along an outer periphery of the door panel 10 of the sash-less door 12 (FIG. 1) and front and rear end portions (only the front end portion is illustrated) 132 for covering front and rear upper corners of the door panel 10. The main portion 130 is composed of an extruded body of EPDM sponge rubber which has a tube-like configuration (shown in FIG. 5). A base part 134 of the main portion 130 is secured to a peripheral end surface of the door inner panel 22 of the door panel 10 with clips (not shown) at predetermined intervals.

An upper part of the end portion 132 covers a front upper corner of the door inner panel 22, and has a stepped cross-section conforming with the peripheral surface of the upper part of the door inner panel 22. The upper part of the end portion 132 has a double-layered structure composed of an inside insert member 136 of polypropylene and outside cover member 138 of thermoplastic olefin elastomer. The insert member 136 has a plate-like configuration and covers the front upper corner of the door inner panel 22 in close contact therewith, and the cover member 138 is laid on the insert member 136 to cover outer surfaces thereof. In the end portion 132, there are provided a clip hole 140 which is formed through the cover member 138 and insert member 136 for securing the end portion 132 to the door inner panel 22 by a clip, and a groove 142 for guiding a front edge of the door window pane 18 upon opening and closing thereof.

The cover member 138 of the end portion 132 extends downwardly to define a lower part 144. The lower part 144 has a tube-like configuration of which the cross-section is approximately identical to that of the main portion 130 (shown in FIG. 5). The lower part 144 thus arranged is joined to the main portion 130.

At a rear end of the main portion 130 of the door weatherstripping W2, a rear end portion approximately identical to the front end portion 132 is joined. The illustration and explanation of the rear end portion will be omitted for simplicity.

To prepare the door weatherstripping W2, each end of the extruded main portion 130 and the insert member 136 of polypropylene are placed in a cavity of a mold, and thermoplastic olefin elastomer as a molding material is injected into the cavity.

The temperature of thermoplastic olefin elastomer injected upon molding is about 200° C., but the thermoplastic olefin elastomer is cooled in the cavity in a short time. As a result, only the surface area of the insert member 136 is melted and joined to the molded cover member 138 while the central portion of the insert member 136 is kept unmelted. In this way, a thermal fusion is formed between the insert member 136 and the cover member 138.

Thermoplastic olefin elastomer also has good compatibility with EPDM rubber, and consequently, the lower part 144 of the end portion 132 is fixedly joined to the main portion 130.

By virtue of the polypropylene insert member, the door weatherstripping thus prepared is much lighter and less expensive, as compared to a strip using a metallic insert member. The end portion 132 has the double-layered structure where the insert member 136 is not embedded but merely laid on the inner surface of the cover member 138, because the polypropylene insert member 136 is fixedly joined to the cover member 138 so that it does not fall off, and the polypropylene insert member does not rust, though exposed. With the double-layered structure, the amount of the thermoplastic olefin elastomer required for the cover member is small. A thermoplastic olefin elastomer composing the cover member has flexibility like rubber as to exhibit good sealing performance.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

For example, instead of the double-layered structure wherein the insert member is merely laid on the inner surface of the cover member, the insert member may be embedded in the cover member.

Since the insert member is composed of synthetic resin, the end portion of the door weatherstripping is flexible. The flexible end portion can be brought into close contact with the upper corner of the door inner panel with the use of a resilient force of the synthetic resin by forming the end portion into a W-shaped cross-section having an opening angle slightly smaller than the corresponding corner angle of the door inner panel, as shown in FIG. 6, and attaching the end portion thus formed to the door inner panel while flexing or curving it outwardly, for example.

Figure 7:
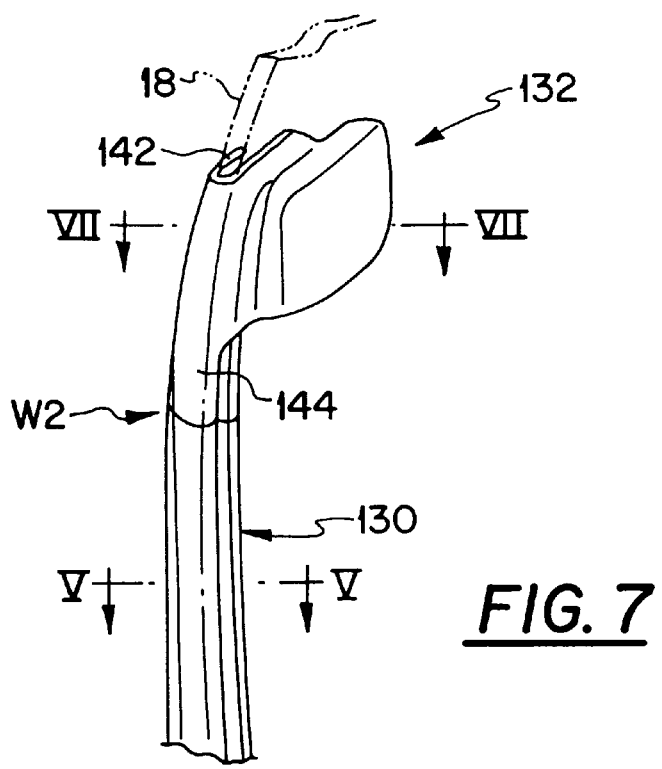
FIG. 7 is a partial perspective view of a second preferred embodiment of door weatherstripping in accordance with the present invention.
Figure 8:
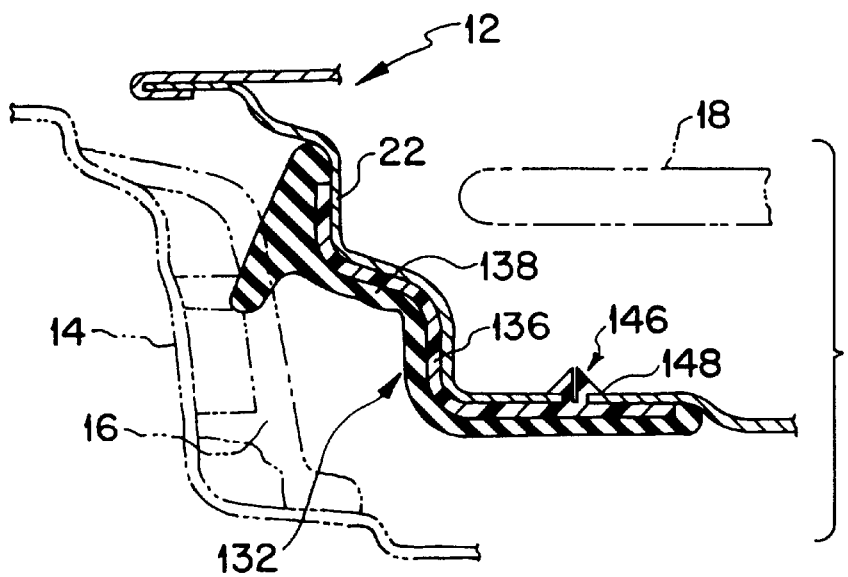
FIG. 8 is a cross-sectional view taken along line VII—VII of FIG. 7.

Furthermore, since the insert member is composed of synthetic resin, in a second preferred embodiment of the present invention clips for securing the end portion of the door weatherstripping to the door panel are formed integrally with the insert member as shown in FIG. 8, where clip 146 is integral with insert member 136 and engages door panel 10 via a through hole 148. By using the insert member having the clips, there is no need to provide clip holes in the cover member for fitting clips. In addition, upon securing the end portion of the door weatherstripping to the door panel, clip heads do not exist in the outer surface of the cover member as shown in FIG. 7 so that an aesthetic appearance can be ensured.

Such variations will be readily apparent to those skilled in the art.

What is claimed is:

1. Door weatherstripping, comprising:
   a main portion attachable along a periphery of a door panel of a sashless door; and
   end portions respectively joined to ends of said main portion;
   said main portion comprising an extruded EPDM rubber body, each of said end portions having a double-layered structure comprising a polypropylene insert member and a thermoplastic olefin elastomer cover member, wherein said cover member is joined to said insert member such that said insert member is not embedded but laid on an inner surface of said cover member, said insert member having a plate-shaped configuration for covering front and rear upper corners of the door panel.

2. Door weatherstripping as claimed in claim 1, wherein said insert member has an integral clip for engaging said door panel via a through hole therein.

* * * * *